United States Patent Office 3,116,987
Patented Jan. 7, 1964

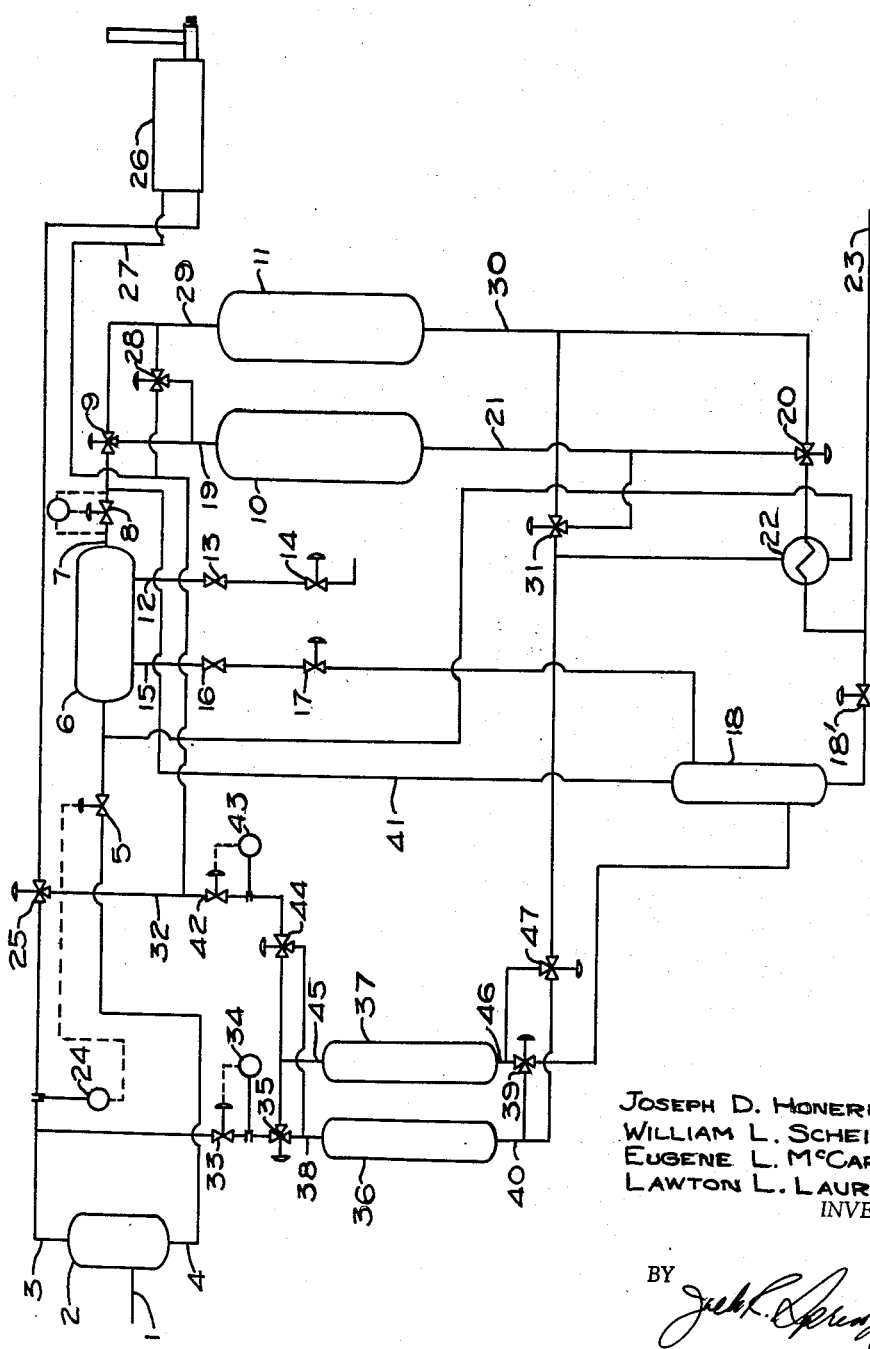

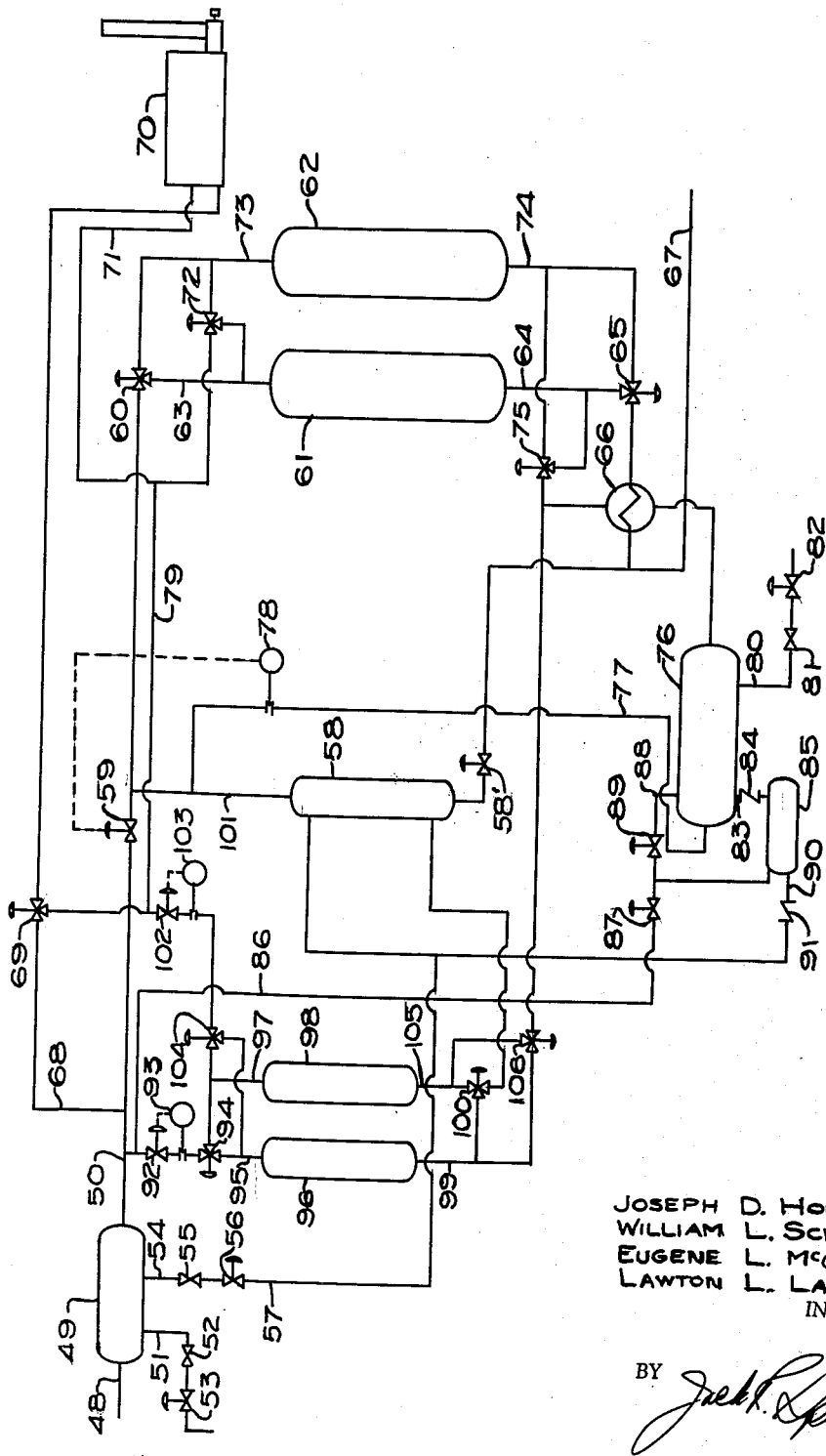

3,116,987
PROCESS AND APPARATUS FOR REMOVAL OF WATER FROM A FLUID STREAM
Joseph D. Honerkamp and William L. Scheirman, Oklahoma City, Okla., Lawton L. Laurence, The Hague, Netherlands, and Eugene L. McCarthy, Oklahoma City, Okla., assignors to Black, Sivalls & Bryson, Inc., Kansas City, Mo., a corporation of Delaware
Filed Oct. 27, 1960, Ser. No. 65,362
11 Claims. (Cl. 55—31)

The present invention relates generally to a process and apparatus for the removal of water and water vapor from a hydrocarbon fluid stream containing an acid gas such as hydrogen sulfide. Specifically, the present invention relates to the dehydration of a natural gas stream wherein such natural gas stream contains hydrocarbons in both liquid and vapor phases and also contains hydrogen sulfide.

Prior to the present invention such natural gas streams have been processed for dehydration by liquid absorption systems and by solid adsorption systems. Many natural gas streams which require dehydration flow from the wellhead as a fluid stream including liquid and gaseous hydrocarbons, water and water vapor and acid gases such as hydrogen sulfide and carbon dioxide. Because of the potential for the recovery of sulfur from hydrogen sulfide, it is desired that the hydrogen sulfide remain in the stream after the stream has been dehydrated. In liquid absorption systems all liquid absorbents used will have at least some affinity for hydrogen sulfide and after intimate contact with a stream containing hydrogen sulfide, will discharge the absorbed hydrogen sulfide on regeneration from the liquid absorbent regenerating equipment. Since most regenerating equipment for liquid absorption systems are designed to discharge the vapors of components which have been driven out of the liquid absorbent during regeneration directly into the atmosphere, such regeneration of liquid absorbent containing hydrogen sulfide would cause the discharge of hydrogen sulfide to the atmosphere. This is a waste of a valuable component of the gas stream. Even when flared, this unrestricted discharge will be extremely objectionable from the standpoint of contamination of the air and corrosion of metallic structures near the regenerating equipment. To avoid this condition in a liquid absorption system it is necessary that a secondary gas stream substantially free of hydrogen sulfide and compatible with the main gas stream being dehydrated be available in sufficient volume and pressure to strip the hydrogen sulfide from the liquid absorbent before regeneration and to return the hydrogen sulfide to the main gas stream.

Another problem commonly encountered is the dehydration of the liquid phase of the main gas stream. The processing of a natural gas stream is commonly handled at a central plant which is a considerable distance from the wells producing the natural gas. In such situations it is a common practice to transport both liquid and vapor phases of the natural gas stream through a single pipeline to the central processing plant. To avoid the formation of natural gas hydrates the gas stream is often dehydrated at a point near the natural gas well. When a natural gas well produces a substantial amount of liquid hydrocarbons, the liquid hydrocarbons will be saturated with water. For most economical operation of the gathering system of pipelines it is advantageous to remove the water from the liquid hydrocarbons. This reduces the liquid volume to be carried by the pipeline and will prevent formation of ice and hydrates in the pipeline during extreme cold weather. Without this removal of the water from the liquid hydrocarbons, the dehydration of the gas will be ineffective as this water in the liquid hydrocarbons will vaporize and could possibly cause the formation of natural gas hydrates.

Therefore, the primary object of the present invention is to provide a process and apparatus for the dehydration of a natural gas stream containing acid gases. A further object of the present invention is to provide a process for the dehydration of both the liquid and gaseous components of a natural gas stream. Another object of the present invention is to provide a process for dehydration of a natural gas stream containing hydrogen sulfide and to return the hydrogen sulfide removed in the dehydration process to the natural gas stream. A still further object of the present invention is to provide a process for the dehydration of a natural gas stream by adsorption utilizing solid adsorbent material.

These and other objects of the present invention are more fully explained and described in the acompanying drawings.

FIG. 1 is a schematic flow diagram illustrating the preferred form of the novel process of the present invention.

FIG. 2 is a schematic flow diagram illustrating a modified form of the novel process of the present invention.

Referring more in detail to the drawings:

The natural gas stream containing hydrogen sulfide is conducted to the processing equipment of the present invention illustrated in FIG. 1 through main gas line 1 and into inlet separator 2. Within inlet separator 2 a portion of the gas stream which is to be used for regeneration purposes is separated from the liquid component and the remainder of the gaseous component of the main gas stream and is conducted from inlet separator 2 through regeneration gas outlet duct 3. The regeneration gas is conducted through the regeneration system of the present invention as hereinafter more fully described. The remaining gas and the liquid component of the main gas stream are discharged from inlet separator 2 through main stream outlet duct 4, through pressure reducing regulator 5 and into three-phase separator 6.

Within three-phase separator 6 the gaseous component of the main gas stream is separated from the liquid components. The separated gaseous component is conducted through duct 7, differential pressure control valve 8 and three-way switching valve 9 into one of the main stream adsorbers 10 or 11. Three-phase separator 6 is also designed to separate the hydrocarbon condensates from the free water and to discharge the separated water through water outlet 12, shut-off valve 13 and dump valve 14 to suitable disposal (not shown). The separated hydrocarbon condensates are discharged from three-phase separator 6 through condensate outlet 15, shut-off valve 16 and dump valve 17 into stripping vessel 18.

Assuming three-way switching valve 9 is positioned to direct the gas stream through inlet 19 into main stream adsorber 10, then three-way switching valve 20 will be positioned to direct the gas stream leaving main stream adsorber 10 through outlet 21, through regeneration gas cooler 22 and into main stream outlet 23. Liquids are dumped from stripping vessel 18 through dump valve 18' into main stream outlet 23.

The regeneration gas stream leaving inlet separator 2 is conducted through flow controller 24, three-way switching valve 25 and into heater 26 when main stream adsorber 11 is being regenerated with hot regeneration gas. The heated regeneration gas flows from heater 26 through duct 27, three-way switching valve 28 and duct 29 into main stream adsorber 11. The regeneration gas leaving main stream adsorber 11 flows through duct 30, three-way switching valve 31, regeneration gas cooler 22 and into the main gas stream at a point between pressure reducing regulator 5 and three-phase separator 6 as clearly shown in FIG. 1. In flowing through main stream adsorber 11 the hot regeneration gas will vaporize the water and heavier hydrocarbons previously adsorbed by the adsorbent material therein. Cooling of the regeneration gas stream in cooler 22 will cause the vapors that have been vaporized by the hot regeneration gas to condense. These condensates are separated from the main gas stream in three-phase separator 6. Cooling of the regeneration gas stream in cooler 22 may also be accomplished by utilizing some external cooling source without departing from the present invention.

When sufficient regeneration of main stream adsorber 11 has been accomplished, three-way switching valve 25 will be actuated causing the regeneration gas stream to bypass heater 26 through duct 32. Any method of sensing the completion of regeneration of the adsorbent material within main stream adsorber 11, e.g., a temperature sensing element in duct 30 (not shown) or a timing mechanism (not shown), may be used to actuate three-way switching valve 25. The bypassing of heater 26 causes the regeneration gas to flow through three-way switching valve 28, duct 29 and into main stream adsorber 11 to cool the adsorbent material therein. A period of cooling has been found to be necessary before the main gas stream is switched into a regenerated adsorbent material since the heat in the adsorbent material and the vessel which contains the adsorbent material will prevent the adequate adsorption of the water vapor from the main gas stream. The flow of the cooling gas leaving main stream adsorber 11 follows the flow path of the hot regeneration gas and is returned to the main gas stream at a point between pressure reducing regulator 5 and three-phase separator 6.

By using a time switching mechanism (not shown) the main gas stream will be delivered to main stream adsorber 11 after regeneration and cooling of adsorber 11 and when the adsorbent material within main stream adsorber 10 is approaching a saturation condition. This switching is accomplished by actuating three-way switching valve 9 to deliver the main gas stream to main stream adsorber 11 and by actuating three-way switching valve 20 to deliver the main gas stream through regeneration gas cooler 22 into main stream outlet 23. Also, three-way switching valve 25 will be actuated to deliver regeneration gas to heater 26 and three-way switching valves 28 and 31 will be actuated to cause the regeneration gas to flow through main stream adsorber 10, regeneration gas cooler 22 and into main gas stream at a point between pressure reducing regulator 5 and three-phase separator 6. The cooling of main stream adsorber 10 upon completion of regeneration will be accomplished by actuating three-way switching valve 25 to cause the regeneration gas to bypass heater 26 and cool the adsorbent material within main stream adsorber 10 as previously described in relation to the cooling of main stream adsorber 11.

In dehydrating such natural gas streams it is desirable that the liquid hydrocarbons of the stream also be dehydrated. To accomplish this dehydration of the liquid hydrocarbons stripping vessel 18 has been provided. The liquid hydrocarbons are separated from the main gas stream in three-phase separator 6 and are delivered to stripping vessel 18. A small portion of the main gas stream is caused to flow from regeneration gas outlet 3, through valve 33, flow controller 34 and three-way switching valve 35 into stripping gas adsorber 36 or 37. Assuming that stripping gas adsorber 36 is receiving the stripping gas stream, then three-way switching valve 35 will be open into inlet 38 of stripping gas adsorber 36 and three-way switching valve 39 will be open to connect outlet duct 40 of stripping gas adsorber 36 into stripping vessel 18. Stripping gas adsorbers 36 and 37 contain an adsorbent material which is designed to remove the water vapor from the stripping gas stream. This adsorbent material may be the same type of material as is used in main gas adsorbers 10 and 11. The stripping gas enters stripping vessel 18 and contacts the liquid hydrocarbons delivered thereto from three-phase separator 6. Since the stripping gas stream has been dehydrated in stripping gas adsorber 36, it will pick up solution and entrained water from the liquid hydrocarbons. Care should be taken that sufficient stripping gas is circulated to assure the desired degree of drying of the hydrocarbons within stripping vessel 18. The stripping gas discharges from stripping vessel 18 through outlet duct 41 and connects into the main gas stream at a point between differential pressure control valve 8 and three-way switching valve 9.

When the stripping gas is flowing through stripping gas adsorber 36, stripping gas adsorber 37 is being regenerated. A portion of the main regeneration gas stream is used for regenerating stripping gas adsorber 37. The heated regeneration gas flows from heater 26 through duct 27, valve 42, flow controller 43, three-way switching valve 44 and inlet 45 into stripping gas adsorber 37. The hot regeneration gas stream flowing through stripping gas adsorber 37 will vaporize the components of the stripping gas stream previously adsorbed by the adsorbent material. The regeneration gas stream is discharged from stripping gas adsorber through outlet 46, three-way switching valve 47 and flows into regeneration gas cooler 22 with the main regeneration gas stream for cooling and subsequent discharge into the main gas stream ahead of three-phase separator 6. Stripping gas adsorbers 36 and 37 should be sized in proportion to the stripping gas needed so that they will provide adequate adsorption of the stripping gas stream. Also, the regeneration gas rate for stripping gas adsorbers 36 and 37 must be adjusted to the proper rate to regenerate stripping gas adsorbers 36 and 37 within the time required. This time will be set by the regeneration time of main stream adsorbers 10 and 11. When the regeneration of the main gas adsorber being regenerated is completed, the cooling gas flowing from regeneration gas outlet duct 3 through three-way switching valve 25 will flow through valve 42, flow controller 43, three-way switching valve 44 and inlet 45 into stripping gas adsorber 37 to cool the adsorbent material therein. As in the cooling of the main gas adsorbers 10 and 11 sufficient cooling should be provided to cool stripping gas adsorber 37 and the adsorbent material contained therein.

Upon completion of the regeneration and cooling cycle of main gas adsorber 11, three-way switching valves 35, 39, 44 and 47 will be actuated to allow the stripping gas stream to flow through stripping gas adsorber 37 and the hot regeneration gas to flow through stripping gas adsorber 36.

The process illustrated in FIG. 2 is similar in all details to the process illustrated in FIG. 1 except that a separator is provided to remove the condensates from the regeneration gas stream after cooling and a three-phase separator is used as an inlet gas separator.

In operation the main gas stream enters the process illustrated in FIG. 2 through main gas line 48 and flows into inlet separator 49. Inlet separator 49 is a three-phase separator and discharges gas through gas outlet duct 50, water through outlet duct 51 through shut-off valve 52 and dump valve 53 to suitable disposal or other use (not shown) and the liquid hydrocarbons through outlet 54, shut-off valve 55, dump valve 56 and duct 57 into stripping vessel 58.

The main gas stream flows through gas outlet duct 50 and pressure reducing regulator 59 to three-way switching valve 60. The position of three-way switching valve 60 determines the flow of the main gas stream either to main stream adsorber 61 or main stream adsorber 62. Assuming that three-way switching valve 60 is positioned to provide open connection to main stream adsorber 61, then the main gas stream will flow through three-way switching valve 60 and inlet duct 63 into main stream adsorber 61. As mentioned in the discussion of FIG. 1, both main stream adsorbers 61 and 62 are charged with an adsorbent material suitable for removing the water vapor from the main gas stream. The dehydrated main gas stream is discharged from main stream adsorber 61 through outlet duct 64, three-way switching valve 65 and regeneration gas cooler 66 into main stream outlet 67. Liquids are discharged from stripping vessel 58 through dump valve 58' into main stream outlet 67.

Regeneration gas is withdrawn from gas outlet duct 50 at a point upstream of pressure reducing regulator 59 and flows through duct 68 and three-way switching valve 69 into heater 70. The hot regeneration gas flows from heater 70 through duct 71 to three-way switching valve 72. With the main gas stream flowing through main stream adsorber 61, three-way switching valve 72 will be positioned to deliver the hot regeneration gas stream through inlet duct 73 into main stream adsorber 62. The hot regeneration gas flowing through main stream adsorber 62 will vaporize the components previously adsorbed from the main gas stream. The regeneration gas and vapors picked up in main stream adsorber 62 are discharged through outlet duct 74, three-way switching valve 75 and regeneration gas cooler 66 where a major portion of the vapors picked up in main stream adsorber 62 will be condensed to liquids and into regeneration gas separator 76. Regeneration gas is discharged from regeneration gas separator 76 through outlet duct 77 and into the main gas stream at a point downstream from pressure reducing regulator 59. Flow controller 78 is positioned in outlet duct 77 and is connected to control pressure reducing regulator 59 to assure that there is sufficient pressure drop in the main gas stream flowing through pressure reducing regulator 59 to cause an adequate amount of regeneration gas to flow through the regeneration gas system just described.

When the heating portion of the regeneration cycle is completed, three-way switching valve 69 will be actuated to cause the regeneration gas to flow through duct 79, three-way switching valve 72 and duct 73 into main stream adsorber 62 bypassing heater 70 and providing a cool gas stream to cool main stream adsorber 62 and the adsorbent material contained therein.

The water separated from the regeneration gas stream in regeneration gas separator 76 is discharged through water outlet 80, shut-off valve 81 and dump valve 82 to suitable disposal or use (not shown). The liquid hydrocarbons separated from the regeneration gas in regeneration gas separator 76 are discharged through outlet 83 and check valve 84 into blow case 85. Blow case 85 is connected to the main gas stream by duct 86 as shown. Valve 87 is positioned in duct 86. Duct 88 connects from duct 86 through valve 89 into regeneration gas separator 76. By proper operation of valves 87 and 89 the liquid hydrocarbons collecting in blow case 85 are periodically discharged through outlet 90 and check valve 91 into stripping vessel 58.

As discussed with reference to FIG. 1, it is believed necessary to obtain proper dehydration of the natural gas stream to dehydrate the liquid hydrocarbons flowing with the natural gas stream. Therefore, stripping gas is conducted from gas outlet duct 50 in amounts sufficient to accomplish the desired dehydration of the liquid hydrocarbons. This stripping gas flows through valve 92 and flow controller 93 to three-way switching valve 94. Three-way switching valve 94 controls the flow of stripping gas either through inlet 95 into stripping gas adsorber 96 or through inlet 97 into stripping gas adsorber 98. Assuming that stripping gas adsorber 96 is being used to dehydrate the stripping gas stream, then stripping gas adsorber 98 will be in the process of regeneration as hereinafter more fully explained. The dried stripping gas flows from stripping gas adsorber 96 through outlet 99 and three-way switching valve 100 into stripping vessel 58. After intimately contacting the liquid hydrocarbons in stripping vessel 58, the stripping gas flows through stripping vessel gas outlet 101 and into the main gas stream at a point downstream of pressure reducing regulator 59 as shown in FIG. 2.

The regeneration of stripping gas adsorber 98 is accomplished by hot regeneration gas flowing from duct 79 through valve 102, flow controller 103 and three-way switching valve 104 into stripping gas adsorber 98. The regeneration gas after vaporizing the components previously adsorbed from the stripping gas stream in stripping gas adsorber 98 flows through outlet 105 and three-way switching valve 106 into the main regeneration gas stream flowing into regeneration gas cooler 66. To provide cooling of stripping gas adsorber 98, three-way switching valve 69 is actuated and cool regeneration gas flows through the stripping gas regeneration system just described but bypasses heater 70.

When the main stream adsorber 61 is approaching a condition of saturation of the adsorbent material contained therein, the main gas stream is caused to flow through main stream adsorber 62 and the regeneration gas stream flows through main stream adsorber 61. At the same time the flow of stripping gas is switched to flow through stripping gas adsorber 98 and the regeneration gas flows through stripping gas adsorber 96. Also at the same time valve 69 is actuated to cause the regeneration gas to flow through heater 70 until such time as main gas adsorber 61 and stripping gas adsorber 96 are regenerated and then heater 70 will be bypassed to cool main gas adsorber 61 and stripping gas adsorber 96. Thus, while main stream adsorbers 61 and 62 are alternately on stream or being regenerated, stripping gas adsorbers 96 and 98 at the same time will be alternately on stream or being regenerated. It is important that stripping gas adsorbers 96 and 98 be properly sized to process the flow of stripping gas necessary to dehydrate the hydrocarbon liquids and to do it in the proper period of time so that the sequencing of regeneration will coincide with the sequencing of the regeneration of main stream adsorbers 61 and 62.

The scope of the present invention contemplates the use of the common types of adsorbent materials used in prior processes. Also, it should be noted that the present invention contemplates the use of a packed vessel, bubble cap trays or any other type of device which will provide the intimate contacting necessary for stripping vessels 18 and 58.

From the foregoing discussion and description it may be seen that the present invention has provided an improved process and apparatus for the dehydration of a natural gas stream containing an acid gas such as hydrogen sulfide wherein both the gas component and the liquid component of such natural gas stream are dehydrated and wherein the hydrogen sulfide component is not lost from the natural gas stream. Further, the present invention provides a process for the dehydration of a natural gas stream containing hydrogen sulfide wherein discharge of the hydrogen sulfide to the atmosphere and the subsequent contamination and corrosion associated with such a discharge is effectively prevented.

What we claim and desire to secure by Letters Patent is:

1. The process of dehydrating a natural gas stream comprising, initially separating the liquid component from the gaseous component of the natural gas stream, adsorbing water and water vapor from said gaseous component, withdrawing a portion of said natural gas stream, adsorbing the water and water vapor from said withdrawn portion of said natural gas stream, thereafter flowing said withdrawn portion of said natural gas stream in intimate contact with said liquid component of said natural gas stream whereby the water in said liquid component is stripped therefrom by said withdrawn portion of said natural gas stream, flowing said withdrawn portion after contact with said liquid component into said natural gas stream and periodically regenerating the material adsorbing water and water vapor from said gaseous component and the material adsorbing water and water vapor from said withdrawn portion of said natural gas stream.

2. The process of dehydrating a natural gas stream comprising, initially separating the liquid component from the gaseous component of the natural gas stream, separating the hydrocarbon liquids from the water of said liquid component, flowing the hydrocarbon liquids into a stripping zone, adsorbing water and water vapor from the separated gaseous component of the natural gas stream, vaporizing the adsorbed water and water vapor with a heated regeneration gas stream, cooling said regeneration gas stream to condense water and hydrocarbon vapors in said regeneration gas stream, separating the condensates from said regeneration gas stream, separating the hydrocarbon condensates from the water, flowing the hydrocarbon condensates into said stripping zone, withdrawing a portion of said natural gas stream, flowing said withdrawn portion of said natural gas stream into intimate contact with the hydrocarbon liquids in said stripping zone to strip the water from said hydrocarbon liquids, flowing said withdrawn portion of said natural gas stream from said stripping zone into the nautral gas stream, and discharging said hydrocarbon liquids from said stripping zone.

3. A dehydrating apparatus comprising, a separator, said separator having an inlet, a gas outlet, a hydrocarbon liquid outlet and a water outlet, a plurality of main adsorption vessels, means connecting said gas outlet of said separator to said main adsorption vessels, a stripping vessel, means connecting said hydrocarbon liquid outlet of said separator to said stripping vessel, means supplying stripping gas to said stripping vesesl, adsorption means in said means supplying stripping gas to remove water and water vapor from said stripping gas before it is introduced into said stripping vessel, and regeneration means for regenerating said main adsorption vessels and said adsorption means.

4. Invention according to claim 3 wherein said adsorption means comprises a plurality of stripping gas adsorption vessels.

5. A dehydrating apparatus comprising, a separator, said separator having a main stream inlet, a gas outlet, a water outlet and a hydrocarbon liquid outlet, means connecting a natural gas stream to be dehydrated into said main stream inlet of said separator, a plurality of main adsorption vessels, a stripping vessel, means supplying relatively dry stripping gas to said stripping vessel, means connecting said hydrocarbon liquid outlet of said separator to said stripping vessel, means connecting said gas outlet of said separator to said main adsorption vessels, outlet means from said main adsorption vessels, a regeneration gas system for periodically regenerating the adsorbent material contained in said adsorption vessels, means condensing vapors in said regeneration gas system, means separating and conducting condensed hydrocarbon liquids from said regenerating gas system to said stripping vessel and means connecting the gas outlet of said stripping vessel into said natural gas stream.

6. Invention according to claim 5 wherein said separator comprises said means separating hydrocarbon liquids from said regeneration gas system and said regeneration system withdraws regeneration gas from said natural gas stream and returns regeneration gas from the regeneration system into said natural gas stream at a point ahead of said main stream inlet of said separator.

7. Invention according to claim 5 wherein said means separating hydrocarbon liquids from said regeneration gas system comprises a regeneration gas separator and a blow case through which the hydrocarbon liquids from said regeneration gas separator flow in being delivered to said stripping vessel.

8. Invention according to claim 5 including means conducting the stripped hydrocarbon liquids from said stripping vessel to said outlet means of said main adsorption vessels.

9. The process of dehydrating a natural gas stream comprising,
flowing said natural gas stream to a separation zone,
separately discharging the gaseous component of said natural stream, the hydrocarbon liquid component of said natural gas stream and the free water component of said natural gas stream from said separation zone,
adsorbing water and water vapor from the separated gas component of said natural gas stream,
withdrawing a portion of the gaseous component of said natural gas stream,
adsorbing water and water vapor from said withdrawn portion of said gaseous component of said natural gas stream,
thereafter flowing said withdrawn portion of said gaseous component of said natural gas stream in intimate contact with the separated hydrocarbon liquid component of said natural gas stream whereby water in said separated hydrocarbon component is stripped therefrom by said withdrawn portion of said gaseous component of said natural gas stream,
flowing said withdrawn portion after contact with said hydrocarbon liquid component into said separated gaseous component of said natural gas stream prior to the adsorption of water and water vapor therefrom, and
periodically regenerating the material adsorbing water and water vapor from said gaseous component and the material adsorbing water and water vapor from said withdrawn portion of said gaseous component of said natural gas stream.

10. The process of dehydrating a natural gas stream containing a natural gas, hydrogen sulfide, hydrocarbon condensates, water and water vapor comprising,
initially separating the liquid component from the gaseous component of the natural gas stream,
withdrawing a portion of the gaseous component from said separated gaseous component,
adsorbing water and water vapor from said separated gaseous component,
adsorbing water and water vapor from said withdrawn portion of said gaseous component,
flowing the dehydrated withdrawn portion of said gaseous component in intimate contact with said liquid component of said natural gas stream whereby the water in said liquid component is stripped therefrom by said withdrawn portion of said gaseous component,
flowing said withdrawn portion of said gaseous component after contact with said liquid component into said separated gaseous component, and
periodically regenerating the material adsorbing water and water vapor from said separated gaseous component and the material adsorbing water and water vapor from said withdrawn portion of said gaseous component.

11. The process of dehydrating a natural gas stream containing natural gas, hydrogen sulfide, hydrocarbon condensates, water and water vapor comprising,
initially separating a portion of the gaseous component from said natural gas stream,
dividing said initially separated gaseous component into two streams,
adsorbing water and water vapor from one of said divided streams,
heating the other of said divided streams,
separating the liquid components from the gaseous components of said natural gas stream,
adsorbing water and water vapor from said separated gaseous component of said natural gas stream, stripping water from said separated liquid component by flowing it in intimate contact with said dehydrated one of said divided streams.

flowing said heated one of said divided streams to regenerate the adsorbent material adsorbing water and water vapor from said separated gaseous component and to regenerate the adsorbent material adsorbing water and water vapor from one of said divided streams of said initially separated gaseous component, flowing said dehydrated one of said divided streams after contact with said separated liquid component into said separated gaseous component, and flowing said heated one of said divided streams after regeneration of said adsorbent materials into said gaseous component.

References Cited in the file of this patent

UNITED STATES PATENTS

| | | | |
|---|---|---|---|
| 2,677,438 | Reid | May 4, | 1954 |
| 2,706,532 | Ringo et al. | Apr. 19, | 1955 |
| 2,952,611 | Haxton et al. | Sept. 13, | 1960 |
| 2,957,544 | Baker | Oct. 25, | 1960 |
| 2,982,721 | Dow | May 2, | 1961 |
| 2,995,203 | Maurer | Aug. 8, | 1961 |
| 2,996,142 | Worley | Aug. 15, | 1961 |
| 3,024,867 | Milton | Mar. 13, | 1962 |